(12) United States Patent
Khachaturian

(10) Patent No.: US 8,896,464 B2
(45) Date of Patent: Nov. 25, 2014

(54) NAVIGATION DEVICE AND METHOD FOR PROVIDING WARNINGS FOR A SPEED TRAP

(75) Inventor: Arshak Khachaturian, Harlem (NL)

(73) Assignee: TomTom International B.V., Amsterdam (NL)

( * ) Notice: Subject to any disclaimer, the term of this patent is extended or adjusted under 35 U.S.C. 154(b) by 1147 days.

(21) Appl. No.: 12/225,733

(22) PCT Filed: Jun. 27, 2006
(Under 37 CFR 1.47)

(86) PCT No.: PCT/NL2006/050146
§ 371 (c)(1),
(2), (4) Date: Apr. 21, 2010

(87) PCT Pub. No.: WO2008/002126
PCT Pub. Date: Jan. 3, 2008

(65) Prior Publication Data
US 2011/0175751 A1  Jul. 21, 2011

(51) Int. Cl.
*G08G 1/09*  (2006.01)
*G01C 21/36*  (2006.01)
*G08G 1/01*  (2006.01)
*G06F 7/00*  (2006.01)
*G06F 19/00*  (2011.01)
*G09F 11/02*  (2006.01)
*G01S 19/48*  (2010.01)

(52) U.S. Cl.
CPC .................................. *G01C 21/3697* (2013.01)
USPC ............. 340/905; 340/936; 701/36; 701/119; 701/93; 701/420; 40/473; 342/357.31

(58) Field of Classification Search
USPC ................................ 340/905; 701/36; 40/473
See application file for complete search history.

(56) References Cited

U.S. PATENT DOCUMENTS

| 4,216,530 A * | 8/1980 | Yamaki et al. ................. 702/149 |
| 2003/0052797 A1* | 3/2003 | Rock et al. ..................... 340/936 |
| 2004/0107037 A1* | 6/2004 | Straub ............................. 701/93 |
| 2006/0207137 A1* | 9/2006 | Lauenburg ....................... 40/473 |

(Continued)

FOREIGN PATENT DOCUMENTS

| DE | 196 04 892 | 7/1997 |
| EP | 1 266 238 | 3/2005 |
| FR | 2 866 437 | 8/2005 |

OTHER PUBLICATIONS

International Search Report issued Mar. 5, 2007 for International Application No. PCT/NL2006/050146.

*Primary Examiner* — Jack K Wang

(57) ABSTRACT

At least one embodiment of the invention relates to a navigation device for providing warnings when a detection point of a speed trap is approached, including a processor unit arranged to communicate with memory unit and to receive positional information from a positioning device. The memory unit may include a speed trap database, including at least one detection point of a location of a speed trap. The navigation device of at least one embodiment is arranged to provide a warning when one of the at least one detection point is approached. The memory unit is further arranged to include at least a further detection point associated with at least one of the stored detection points, both relating to a same point to point speed trap. In at least one embodiment, the navigation device is arranged to provide a warning when the further detection point is approached or has been passed.

23 Claims, 5 Drawing Sheets

(56) References Cited

U.S. PATENT DOCUMENTS

Figure 1:
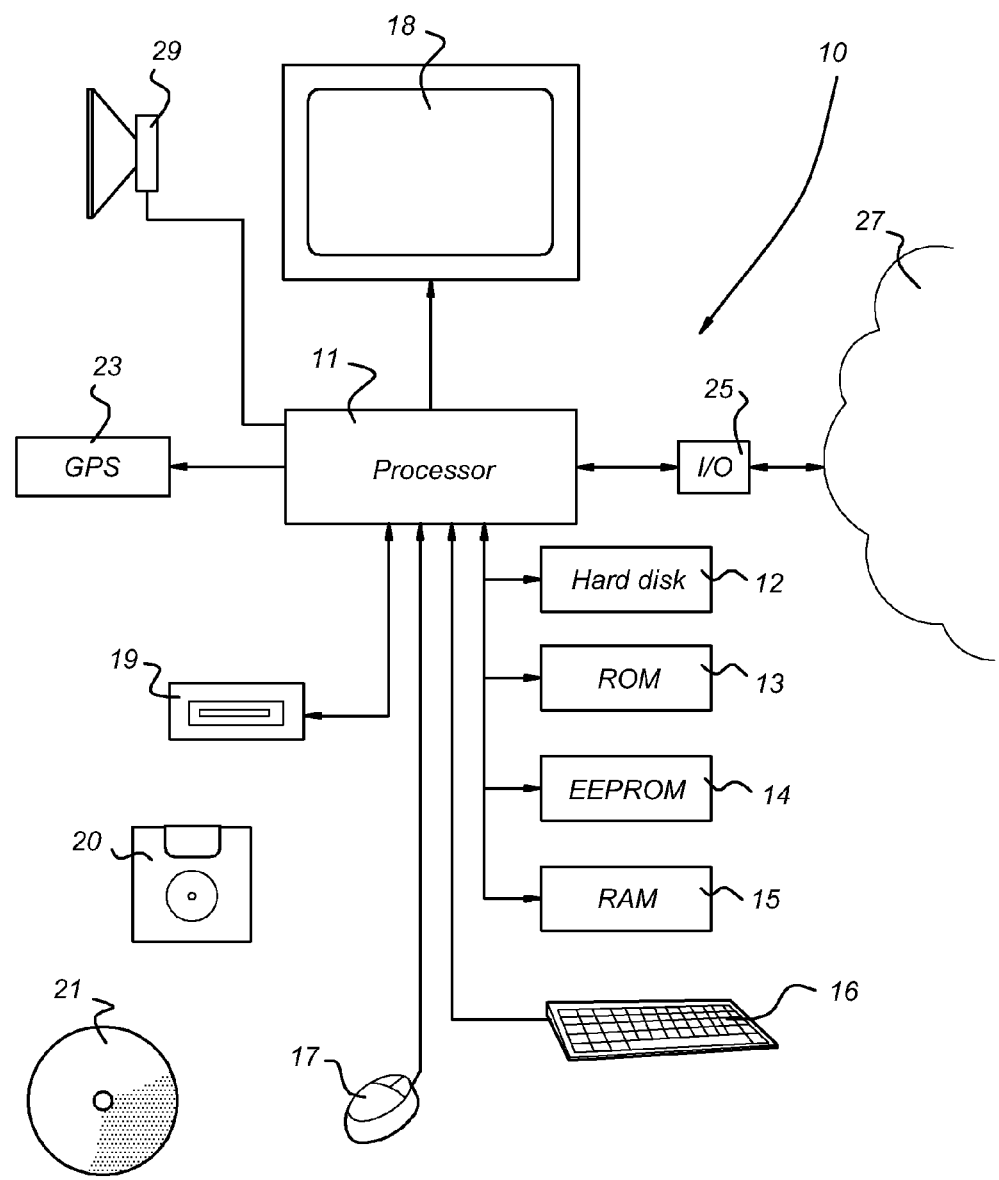

2006/0212196 A1* 9/2006 Davidson et al. ............... 701/36
2007/0027583 A1* 2/2007 Tamir et al. ...................... 701/1
2007/0100687 A1* 5/2007 Yoshikawa ...................... 705/13

* cited by examiner

NAVIGATION DEVICE AND METHOD FOR PROVIDING WARNINGS FOR A SPEED TRAP

TECHNICAL FIELD

The present invention relates to a navigation device for providing warnings when a detection point of a speed trap is approached. The invention further relates to a vehicle comprising such a navigation device and a method for providing warnings when a detection point of a speed trap is approached. Also, the present invention relates to a computer program and a data carrier.

STATE OF THE ART

Prior art navigation devices based on GPS (Global Positioning System) are well known and are widely employed as in-car navigation systems. Such a GPS based navigation device relates to a computing device which in a functional connection to an external (or internal) GPS receiver is capable of determining its global position. Moreover, the computing device is capable of determining a route between start and destination addresses, which can be input by a user of the computing device. Typically, the computing device is enabled by software for computing a "best" or "optimum" route between the start and destination address locations from a map database. A "best" or "optimum" route is determined on the basis of predetermined criteria and need not necessarily be the fastest or shortest route.

The navigation device may typically be mounted on the dashboard of a vehicle, but may also be formed as part of an on-board computer of the vehicle or car radio. The navigation device may also be (part of) a hand-held system, such as a PDA or telephone.

By using positional information derived from the GPS receiver, the computing device can determine at regular intervals its position and can display the current position of the vehicle to the user. The navigation device may also comprise memory units for storing map data and a display for displaying a selected portion of the map data.

Also, it can provide instructions how to navigate the determined route by appropriate navigation directions displayed on the display and/or generated as audible signals from a speaker (e.g. 'turn left in 100 m'). Graphics depicting the actions to be accomplished (e.g. a left arrow indicating a left turn ahead) can be displayed in a status bar and also be superimposed upon the applicable junctions/turnings etc. in the map itself.

It is known to enable in-car navigation systems to allow the driver, whilst driving in a car along a route calculated by the navigation system, to initiate a route re-calculation. This is useful where the vehicle is faced with construction work or heavy congestion.

It is also known to enable a user to choose the kind of route calculation algorithm deployed by the navigation device, selecting for example from a 'Normal' mode and a 'Fast' mode (which calculates the route in the shortest time, but does not explore as many alternative routes as the Normal mode).

It is also known to allow a route to be calculated with user defined criteria; for example, the user may prefer a scenic route to be calculated by the device. The device software would then calculate various routes and weigh more favourably those that include along their route the highest number of points of interest (known as POIs) tagged as being for example of scenic beauty.

According to EP 1.266.238 navigation devices comprising a speed trap detection and warning system arranged to warn a driver about dangers, including speed traps, are known. Such a navigation device may comprise storage means configured to store location data defining locations for a plurality of speed traps. A current position of the navigation device is compares to these locations and, depending on the outcome, a user may be alerted. Such speed traps may for instance be a point-to-point speed trap.

It is an object of the invention to provide an improved speed trap warning system.

SHORT DESCRIPTION

According to an aspect there is provided a navigation device for providing warnings when a detection point of a speed trap is approached, the navigation device comprising a processor unit and a memory unit, the processor unit being arranged to communicate with the memory unit and to receive positional information from a positioning device, the memory unit being arranged to comprise a speed trap database, comprising at least one detection point of a location of a speed trap, where the navigation device is further arranged to provide a warning when one of the at least one detection point is approached, characterised in that the memory unit is further arranged to comprise at least a further detection point associated with at least one of the stored detection points, the further detection point and the associated detection point both relate to a same point to point speed trap, where the navigation device is further arranged to provide a warning when the further detection point is approached or has been passed. Such a navigation device provides a user with accurate information about point to point speed traps.

According to an embodiment, the navigation device is arranged to provide a warning that is a general speed trap warning when the detection point is approached in case no further detection point is associated with the detection point that is approached, provide a warning that is a first point to point warning in case the further detection point is associated with the detection point that is approached, and provide a warning that is a second point to point warning in case the further detection point is approached or has been passed. According to such an embodiment, the navigation device provides different warnings for different situations, which is advantageous for a user.

According to an embodiment, the navigation device comprises a display, and the warning may be a visual warning provided via the display or the navigation device comprises a speaker, and the warning may be an audible warning provided via the speaker, or the warning may be a combination of a visual and an audible warning.

According to an embodiment, the navigation device is arranged to provide speeding warnings in between the detection point and the further detection point, if the navigation device detects that a speed of the navigation device exceeds a threshold speed value, the threshold speed value being stored in the memory unit and being associated with a road segment in between the detection point and the further detection point. Such a navigation device provides additional information to a user informing the user about possible violation of the applicable speed limit. The speed may be determined based on received positional information from the positioning device.

According to an embodiment, the navigation device is arranged to provide a speeding warning if a current speed of the navigation device exceeds the threshold speed value or may be arranged to provide a speeding warning if an average speed of the navigation device exceeds the threshold speed value. The average speed may be computed from the first detection point to the current position.

According to an embodiment, the navigation device is arranged to compute an advisory speed. This advisory speed may advise the user what speed to obey in order to prevent leaving the point to point speed trap controlled area to soon.

According to a further aspect there is provided a vehicle, comprising a navigation device according to the above.

According to a further aspect there is provided a method for providing warnings when a detection point of a speed trap is approached, the method comprising:
  providing a speed trap database, comprising at least one detection point of a location of a speed trap,
  providing a warning when one of the at least one detection point is approached, characterised by
  providing at least one further detection point associated with at least one of the stored detection points, the further detection point and the associated detection point both relating to a same point to point speed trap,
  providing a warning when the further detection point is approached or has been passed.

According to a further aspect there is provided a computer program that, when loaded on a computer arrangement, is arranged to perform the method described above.

According to a further aspect there is provided a data carrier, comprising a computer program according to the computer program described above.

SHORT DESCRIPTION OF THE DRAWINGS

Figure 2:
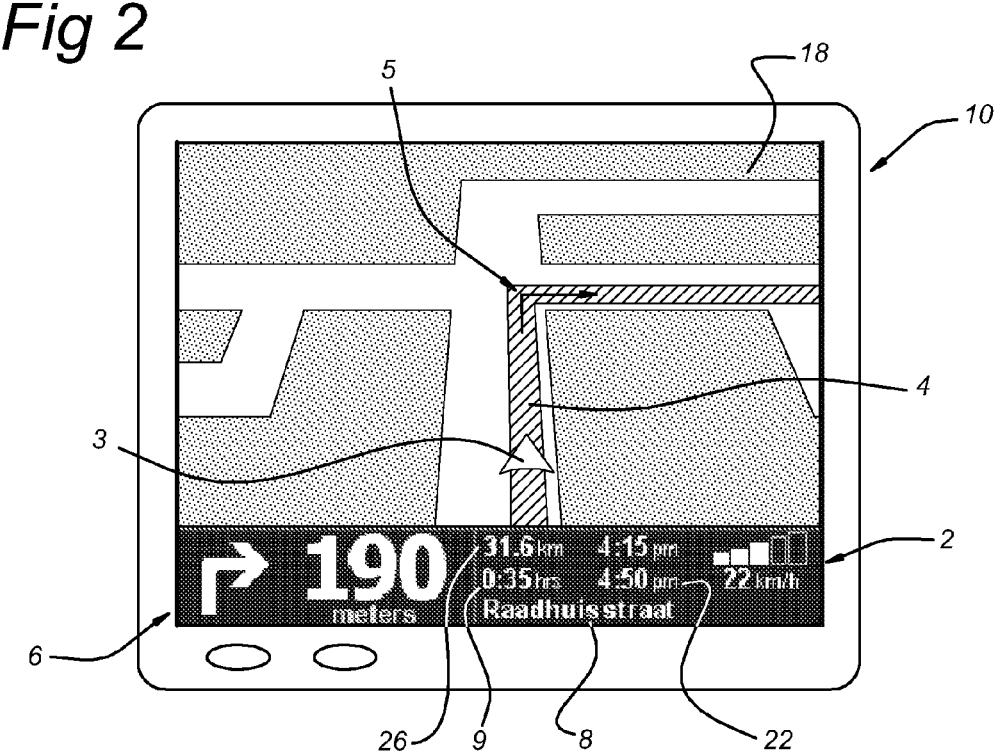
Figure 3:
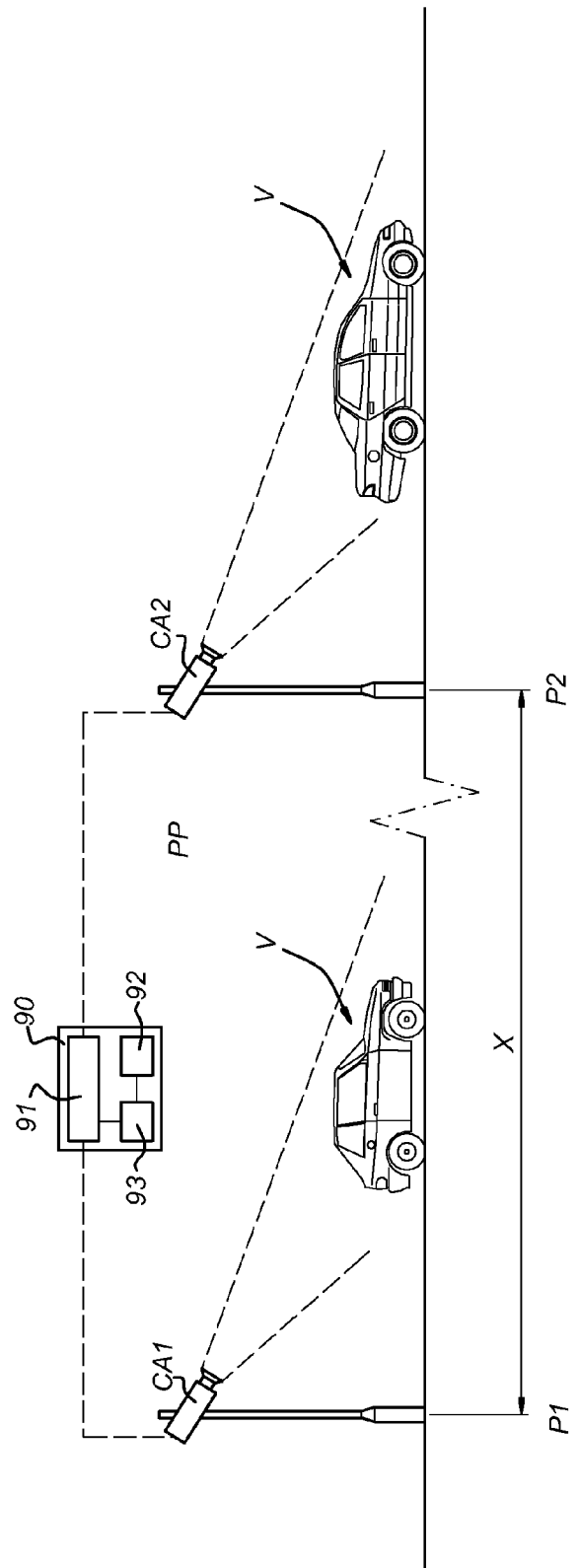
Figure 4:
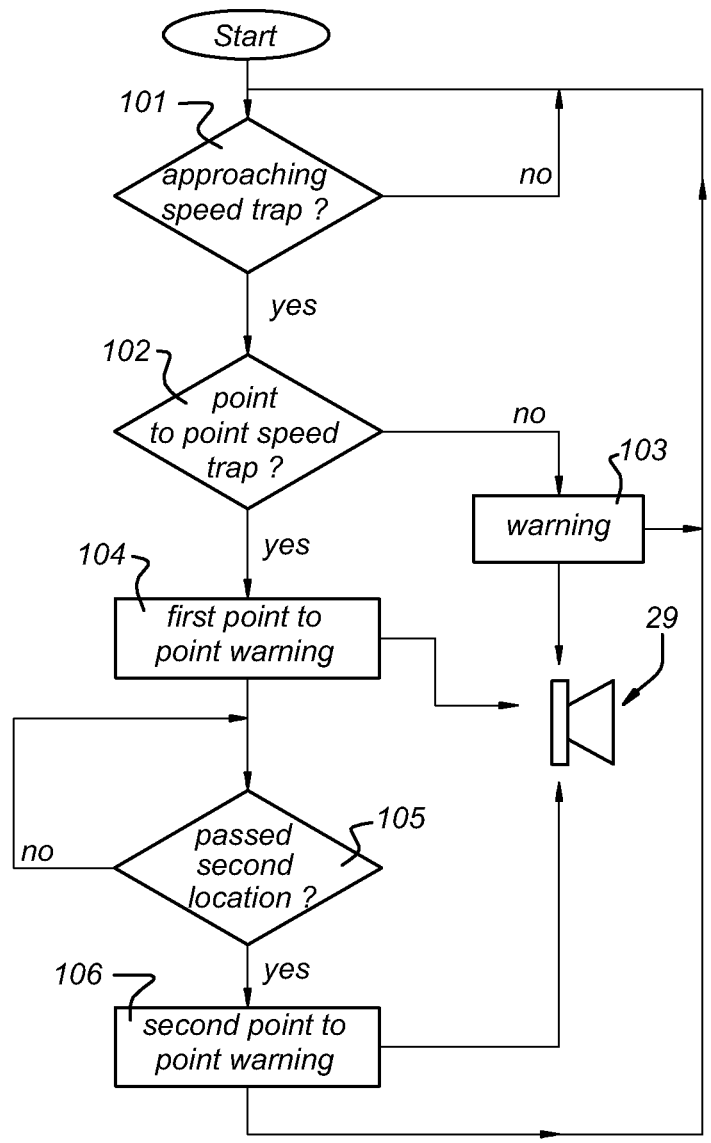

Embodiments of the invention will now be described, by way of example only, with reference to the accompanying schematic drawings in which corresponding reference symbols indicate corresponding parts, and in which:

FIG. 1 schematically depicts a schematic block diagram of a navigation device,

FIG. 2 schematically depicts a schematic view of a navigation device,

FIG. 3 schematically depicts a point to point speed trap,

FIG. 4 schematically depicts a flow diagram according to an embodiment, and

Figure 5:
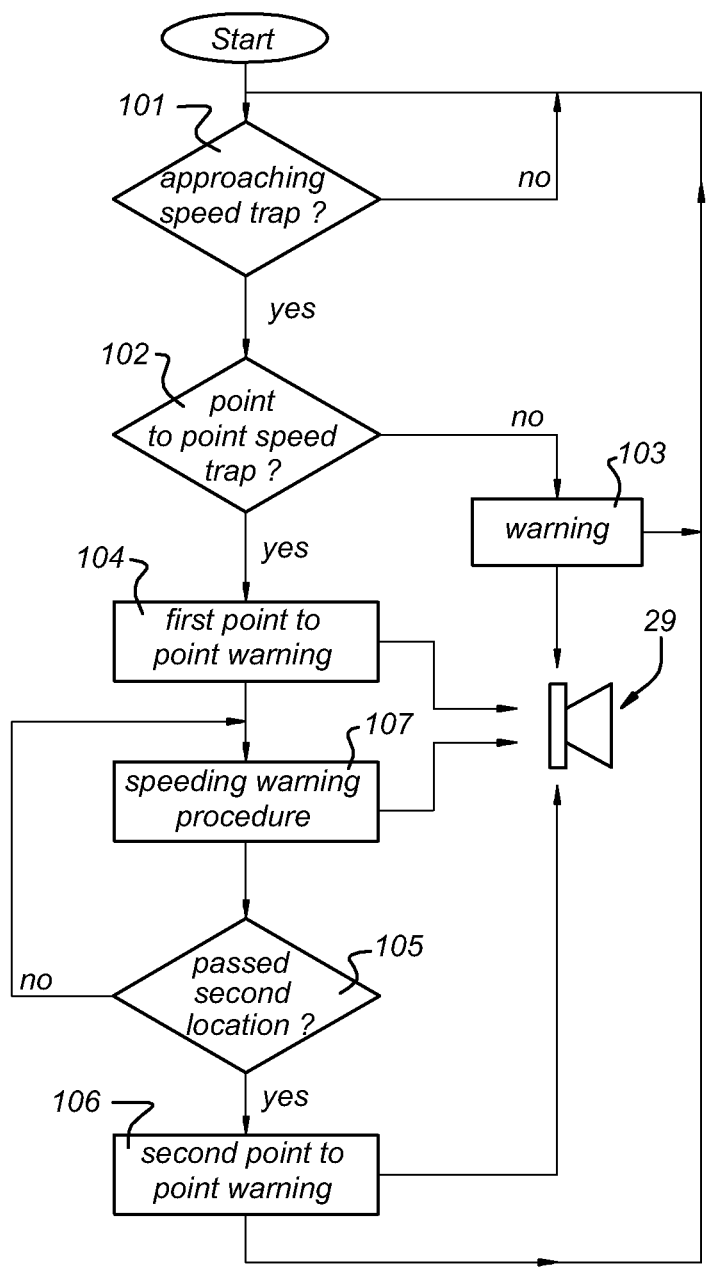

FIG. 5 schematically depicts a flow diagram according to an embodiment.

DETAILED DESCRIPTION

FIG. 1 shows a schematic block diagram of an embodiment of a navigation device 10, comprising a processor unit 11 for performing arithmetical operations. The processor unit 11 is arranged to communicate with memory units that store instructions and data, such as a hard disk 12, a Read Only Memory (ROM) 13, Electrically Erasable Programmable Read Only Memory (EEPROM) 14 and a Random Access Memory (RAM) 15. The memory units may comprise map data. This map data may be two dimensional map data (latitude and longitude), but may also comprise a third dimension (height). The map data may further comprise additional information such as information about petrol/gas stations, points of interest. The map data may also comprise information about the shape of buildings and objects along the road.

The processor unit 11 may also be arranged to communicate with one or more input devices, such as a keyboard 16 and a mouse 17. The keyboard 16 may for instance be a virtual keyboard, provided on a display 18, being a touch screen. The processor unit 11 may further be arranged to communicate with one or more output devices, such as a display 18, a speaker 29 and one or more reading units 19 to read for instance floppy disks 20 or CD ROM's 21. The display 18 could be a conventional computer display (e.g. LCD) or could be a projection type display, such as the head up type display used to project instrumentation data onto a car windscreen or windshield. The display 18 may also be a display arranged to function as a touch screen, which allows the user to input instructions and/or information by touching the display 18 with his finger.

The speaker 29 may be formed as part of the navigation device 10. In case the navigation device 10 is used as an in-car navigation device, the navigation device 10 may use speakers of the car radio, the board computer and the like.

The processor unit 11 may further be arranged to communicate with a positioning device 23, such as a GPS receiver, that provides information about the position of the navigation device 10. According to this embodiment, the positioning device 23 is a GPS based positioning device 23. However, it will be understood that the navigation device 10 may implement any kind of positioning sensing technology and is not limited to GPS. It can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographical location.

However, it should be understood that there may be provided more and/or other memory units, input devices and read devices known to persons skilled in the art. Moreover, one or more of them may be physically located remote from the processor unit 11, if required. The processor unit 11 is shown as one box, however, it may comprise several processing units functioning in parallel or controlled by one main processor that may be located remote from one another, as is known to persons skilled in the art.

The navigation device 10 is shown as a computer system, but can be any signal processing system with analog and/or digital and/or software technology arranged to perform the functions discussed here. It will be understood that although the navigation device 10 is shown in FIG. 1 as a plurality of components, the navigation device 10 may be formed as a single device.

The navigation device 10 may use navigation software, such as navigation software from TomTom B.V. called Navigator. Navigator software may run on a touch screen (i.e. stylus controlled) Pocket PC powered PDA device, such as the Compaq iPaq, as well as devices that have an integral GPS receiver 23. The combined PDA and GPS receiver system is designed to be used as an in-vehicle navigation system. The embodiments may also be implemented in any other arrangement of navigation device 10, such as one with an integral GPS receiver/computer/display, or a device designed for non-vehicle use (e.g. for walkers) or vehicles other than cars (e.g. aircraft).

FIG. 2 depicts a navigation device 10 as described above.

Navigator software, when running on the navigation device 10, causes a navigation device 10 to display a normal navigation mode screen at the display 18, as shown in FIG. 2. This view may provide driving instructions using a combination of text, symbols, voice guidance and a moving map. Key user interface elements are the following: a 3-D map occupies most of the screen. It is noted that the map may also be shown as a 2-D map.

The map shows the position of the navigation device 10 and its immediate surroundings, rotated in such a way that the direction in which the navigation device 10 is moving is always "up". Running across the bottom quarter of the screen may be a status bar 2. The current location of the navigation device 10 (as the navigation device 10 itself determines using conventional GPS location finding) and its orientation (as inferred from its direction of travel) is depicted by a position arrow 3. A route 4 calculated by the device (using route calculation algorithms stored in memory units 12, 13, 14, 15 as applied to map data stored in a map database in memory units 12-15) is shown as darkened path. On the route 4, all major actions (e.g. turning corners, crossroads, roundabouts etc.) are schematically depicted by arrows 5 overlaying the route 4. The status bar 2 also includes at its left hand side a schematic icon depicting the next action 6 (here, a right turn). The status bar 2 also shows the distance to the next action (i.e. the right turn—here the distance is 190 meters) as extracted from a database of the entire route calculated by the device (i.e. a list of all roads and related actions defining the route to be taken). Status bar 2 also shows the name of the current road 8, the estimated time before arrival 9 (here 35 minutes), the actual estimated arrival time 22 (4.50 pm) and the distance to the destination 26 (31.6 Km). The status bar 2 may further show additional information, such as GPS signal strength in a mobile-phone style signal strength indicator.

As already mentioned above, the navigation device may comprise input devices, such as a touch screen, that allows the users to call up a navigation menu (not shown). From this menu, other navigation functions can be initiated or controlled. Allowing navigation functions to be selected from a menu screen that is itself very readily called up (e.g. one step away from the map display to the menu screen) greatly simplifies the user interaction and makes it faster and easier. The navigation menu includes the option for the user to input a destination.

The actual physical structure of the navigation device 10 itself may be fundamentally no different from any conventional handheld computer, other than the integral GPS receiver 23 or a GPS data feed from an external GPS receiver. Hence, memory units 12-15 store the route calculation algorithms, map database and user interface software; a processor unit 12 interprets and processes user input (e.g. using a touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination into the navigation software running on the navigation device 10, using the input devices provided, such as a touch screen 18, keyboard 16 etc. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

The navigation device 10 may further comprise an input-output device 25 that allows the navigation device to communicate with remote systems, such as other navigation devices 10, personal computers, servers etc., via network 27. The network 27 may be any type of network 27, such as a LAN, WAN, Blue tooth, internet, intranet and the like. The communication may be wired or wireless. A wireless communication link may for instance use RF-signals (radio frequency) and a RF-network.

Roads themselves are described in the map database that is part of navigation software (or is otherwise accessed by it) running on the navigation device 10 as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the navigation software. The algorithms are applied to score large numbers of potential different routes. The navigation software then evaluates them against the user defined criteria (or device defaults), such as a full mode scan, with scenic route, past museums, and no speed camera. The route which best meets the defined criteria is then calculated by the processor unit 11 and then stored in a database in the memory units 12-15 as a sequence of vectors, road names and actions to be done at vector end-points (e.g. corresponding to pre-determined distances along each road of the route, such as after 100 meters, turn left into street x).

As already mentioned above, the memory units 12-15 may comprise map data. The map data may comprise additional information such as information about petrol/gas stations, points of interest. The map data may also comprise information about the location of speed traps, such as point to point speed traps.

Point to Point Speed Trap

A point to point speed trap PP is a speed trap comprising a first detection point P1 and a second detection point P2, as schematically depicted in FIG. 3. These points may also be referred to in this text as detection point P1 and further detection point P2, respectively.

The distance X between the first detection point P1 and the second detection point P2 is known, for instance 3500 meters. The point to point speed trap PP is arranged to detect a vehicle V driving past the first detection point P1. All kinds of techniques may be used to detect vehicle V driving past the first detection point P1. Vehicle V may for instance be detected using electromagnetic sensors (not shown) being provided in the road. If vehicle V is detected, a first camera CA1 positioned at the first detection point P1 is caused to take a picture of the vehicle V, for instance of the number plate of the vehicle V.

The point to point speed trap PP may further comprise a processing unit 90. The processing unit 90 may be any type of computer system, for instance comprising an input device 91, a memory unit 92 and a processor 93. The processor 93 is arranged to communicate with the memory unit 92 and the input device 91.

The picture taken by first camera CA1 at the first detection point P1 is transmitted to memory unit 92 via input device 91. The picture taken by the first camera CA1 may be transmitted to the processing unit 90 using any kind of technique, such a simple wire, but also via any kind of network, for instance a wired or wireless network. Also stored in memory unit 92 is a time t1 at which the picture is taken, e.g. 10 h 30 and 23 seconds.

Vehicle V is detected in a similar way when it drives past the second detection point P2. Again, camera CA2, being positioned at the second detection point P2, is caused to take a picture of the vehicle. The picture taken at the second detection point P2 is stored in the memory unit 92 of the processing unit 90 together with a time t2 at which the picture is taken, e.g. 10 h 32 and 10 seconds.

Of course many vehicles may drive past the point to point speed trap PP every minute. Therefore, all pictures stored in memory unit 92 are analyzed and, for instance based on the number plates, pictures showing the same vehicle at the first and second detection point P1 and P2 are grouped together.

Next, the processor 93 computes an average speed of vehicle V in between the first and second detection point P1, P2 based on the time values of t1 and t2 of the first and second picture showing the same vehicle V, and the known distance X between the first and second detection point P1, P2. In this case the average speed of vehicle V is:

$$v_{average} = \frac{X}{t2-t1} = \frac{3500 \text{ m}}{107 \text{ s}} \approx 32{,}7 \text{ m/s} \approx 117{,}8 \text{ km/h},$$

as 10 h 32 and 10 seconds minus 10 h 30 and 23 seconds equals 107 seconds. Next, this computed $v_{average}$ may be compared with a threshold speed value stored in memory unit 92. The threshold speed value may correspond with a maximum speed for the road segment in between detection point P1 and detection point P2. For instance, in case the maximum speed for that road segment is 100 km/h, the threshold speed value may be 100 km/h or 103 km/h. In case $v_{average} > v_{threshold}$, the owner of vehicle V may be fined.

According to the prior art, speed trap warning systems provide a warning when a user approaches a speed trap. Such a warning is generated in case the navigation detects that the navigation device 10 approaches a speed trap, locations of which are stored in a database accessible by the navigation device 10. Most of the speed traps are single standalone systems. For such standalone speed traps it is sufficient to provide a warning indicating that a speed trap is approached. The driver may slow down his/her vehicle and won't get a fine or ticket afterwards.

In a point to point speed trap the average speed is calculated in between the first and second detection point P1, P2. So if the user speeds up his/her vehicle after having passed by the detection point P1, like described above, he/she risks getting fined for driving too fast, because the average speed between the first and second detection point P1, P2 was too high.

Embodiment 1

According to an embodiment, the memory units 12-15 of the navigation device 10 may be arranged to comprise information about the position of a point to point speed trap PP, i.e. information about a first detection point P1 at a first location L1 and a second detection point P2 at a second location L2. Also, information may be stored indicating that first and second detection points P1, P2 are associated with each other, being part of the same speed trap, i.e. a point to point speed trap PP.

The navigation device 10 may be arranged to provide a user with a first warning or information signal when the user approaches the first detection point P1. The warning or information signal may tell the user that he/she is entering a point to point speed trap controlled area.

This first warning may be a distinct sound or spoken message played over speaker 29, and/or a visual warning, such as an icon displayed at display 18.

The navigation device 10 may further be arranged to provide a user with a second warning or information signal when the user has passed the second detection point P2. The warning or information signal may tell the user that he/she has left the point to point speed trap controlled area.

Again, this second warning may be a distinct sound or spoken message played over speaker 29, and/or a visual warning, such as an icon displayed at display 18.

According to a variant, for instance in case the first warning is at least a visual warning, the first warning may be displayed until the navigation device 10 has left the point to point speed trap controlled area. In that case, the second warning is in fact given by no longer providing the first warning.

This feature helps the user to prevent getting a fine or legal penalty because of the fact that he/she did not know that he/she was speeding up in a point to point controlled area of the road. Also, this helps to increases traffic safety in such a zone by constantly informing drivers about it.

According to this embodiment, the navigation device 10 provides a warning that a point to point speed trap controlled area is entered and thus, that the user shouldn't speed up his/her vehicle after having passed the first detection point P1.

By storing a first detection point P1 and a second detection point P2 a user may be given accurate information about the location of a point to point speed trap PP. The user may be given a warning when a point to point speed trap is approached, so when the first point P1 of the point to point speed trap PP is approached, but also when the point to point speed trap PP is exited, i.e. when the second detection point P2 has been passed. Based on this embodiment, the user knows exactly if he/she is in or outside the point to point speed trap controlled area.

According to the prior art, as cited above, current navigation devices 10 give a warning when a user approaches a speed trap, such as a point to point speed trap. However, no indication is provided what type of speed trap is approached and no warning is given when the area controlled by the point to point speed trap is left.

Based on this embodiment, the user will know that he/she should not speed up his vehicle when having passed the first detection point P1, and that he/she should obey the applicable maximum speed value, until he/she has left the point to point controlled area, so when he/she is given a warning or information signal informing that the point to point controlled area has been left.

Based on this embodiment, the memory units 12-15 of the navigation device 10 may be arranged to store a speed trap database that is improved over the prior art. The speed trap database does not only store first detection points P1 with locations of speed traps, but may also store second detection points P2 associated with at least one of the stored first detection points P1, indicating that the first detection point P1 refers to a point to point speed trap which ends on the second detection point P2.

The memory units 12-15 may for instance comprise the following information:

| speed trap database | First detection point P1 | Second detection point P2 |
|---|---|---|
| 1 | $X_1, Y_1$ | — |
| 2 | $X_2, Y_2$ | $X_{2,2}; Y_{2,2}$ |
| 3 | $X_3, Y_3$ | — |
| 4 | $X_4, Y_4$ | $X_{4,2}; Y_{4,2}$ |
| 5 | $X_5, Y_5$ | — |

According to this example, the speed trap database comprises five entries. A first speed trap is located at a first location $X_1, Y_1$, where $X_i$ and $Y_i$ represent the coordinates of the $i^{th}$ speed trap. It will be understood that many ways of indicating the location of a speed trap may be used and that $X_i$, $Y_i$ is just an example of such a representation. The first speed trap may be any type of speed trap, such as a laser speed trap, a radar speed trap and the like.

The second speed trap stored in the speed trap database refers to a point to point speed trap. This may be concluded because next to a first location $X_2, Y_2$, also a second location $X_{2,2}, Y_{2,2}$ associated with the first location $X_2, Y_2$ is stored. The first location $X_2, Y_2$ represent the first detection point P1 of the point to point speed trap PP, and the second location $X_{2,2}, Y_{2,2}$ represents the second detection point P2 of the point to point speed trap PP.

According to this example, in general, the first location $X_i$, $Y_i$ represent the first detection point P1 of the point to point speed trap PP, and the second location $X_{i,2}, Y_{i,2}$ represents the second detection point P2 of the point to point speed trap PP.

So, additional information is added to the speed trap database indicating that a particular speed trap is a point to point speed trap. The software may be arranged to read this information and provide a warning informing the user the a point to point controlled area is entered or will be entered shortly and also inform him when the users has left or is about to leave the point to point controlled area.

Flow Diagram Embodiment 1

According to this embodiment the navigation device 10 may be arranged to execute the actions as presented below and depicted in a flow diagram in FIG. 4.

In a first action 101, the navigation device 10 may be arranged to determine whether or not a speed trap is approached. This may be done in many ways, as will be understood by a skilled person. When determining whether or not a speed trap is approached the navigation device 10 may take into account the distance to the speed traps stored in the speed trap database, the direction of travel of the navigation device 10, the direction in which the speed trap is orientated, the road segment the speed trap is located on, the road segment the navigation device 10 is traveling on etc., as will al be understood by a skilled person. It will be understood that additional information may be stored in the speed trap database to allow such an assessment according to action 101. For executing action 101 the navigation device 10 may use information from the speed trap database stored in memory units 12-15 and the positioning device 23, as schematically depicted in FIG. 4.

In case no speed trap is approached, the navigation device 10 may repeat action 101. In case a speed trap is approached, the navigation device 10 may determine what type of speed trap is approached in an action 102. This may be done by reading out information about the type of speed trap from the speed trap database stored in memory 12-15. According to the example provided above, this is done by checking if a second location $X_{i,2}, Y_{i,2}$ is stored in the speed trap database stored in memory 12-15 associated with the first location $X_i, Y_i$ of the speed trap that is being approached.

In case the speed trap that is being approached is not a point to point speed trap, the navigation device 10 may continue with executing action 103, in which a warning is generated, for instance a general speed trap warning. This warning may be any type of warning, for instance an audible warning provided via speaker 29.

In case the speed trap being approached is a point to point speed trap, the navigation device 10 may continue with executing action 104 in which a first point to point warning is generated. This warning may be any type of warning, for instance an audible warning provided via speaker 29. The first point tot point warning may be different from the warning generated in action 103, to inform the user that a point to point speed trap is being approached, so the user may adapt his/her driving behavior based on this.

Once the point to point warning is generated, the navigation device 10 continues with executing action 105, in which it is determined if the navigation device 10 has passed the second location $X_{i,2}, Y_{i,2}$ being associated with the first location $X_i, Y_i$ of the speed trap. As long as the second location $X_{i,2}, Y_{i,2}$ has not been passed, the navigation device repeats action 105.

Once the second location $X_{i,2}, Y_{i,2}$ has been passed, the navigation device 10 provides a second point to point warning. Again, this second point to point warning may be any type of warning, for instance an audible warning provided via speaker 29. The second point tot point warning may be different from the warning generated in action 103 and from the first point to point warning generated in action 104, to inform the user that the point to point controlled area has been left, so the user may adapt his/her driving behavior based on this.

The first point to point warning may be a spoken message, telling the user: 'You are about to enter a point to point controlled area of the road', while the second point to point warning may be another warning, for instance telling the user 'You have left the point to point controlled area'. The first and second point to point warnings may also be two distinct sounds or tunes.

Of course, all warnings may also be visual warnings being provided via display 18, or a combination of a visible and audible warning.

The navigation device 10 may also be arranged to provide a 'permanent' warning constantly notifying the user that he/she is in a speed controlled area. For instance, in case the warning is a visual warning displayed via display 18, the warning may continuously being displayed until the second location $X_{i,2}, Y_{i,2}$ has been passed. The second point to point warning may therefore simply be stopping providing the first point to point warning.

Embodiment 2

According to a second embodiment, the navigation device 10 may further be arranged to provide speeding warnings in between the first detection point P1 and the second detection point P2, if the navigation device 10 detects that the user is speeding, i.e. violates the speed limit applicable for that particular road segment.

For instance, speeding warnings may be generated if the speed of the navigation device 10 (i.e. the vehicle), for instance determined based on information received using the positioning device 23, exceeds a threshold speed value stored in the memory unit 12-15 of the navigation device 10.

According to an other example, speeding warnings may be generated if the average speed of the navigation device 10 (i.e. the vehicle), for instance determined based on information received using the positioning device 23, exceeds a threshold speed value stored in the navigation device 10.

In both examples, the threshold speed value stored in the memory unit 12-15 may correspond with a maximum speed for the road segment in between detection point P1 and detection point P2. For instance, in case the maximum speed for the road segment is 100 km/h, the threshold speed value may be 100 km/h or 103 km/h.

According to the first example, the navigation device 10 constantly checks the current velocity of the vehicle by comparing successive measurements of the positioning device 23, as is usually constantly done in a navigation device 10. When the velocity as determined exceeds a threshold speed value associated with the road segment and stored in the memory unit 12-15, a speeding warning may be provided.

According to the second example, the average velocity of the navigation device 10 in between the first and second detection points of the point to point speed trap PP is determined and compared with the threshold speed value. In order to do this, the navigation device 10 may be arranged to compute the average speed of the navigation device 10 at least at certain positions or constantly within the point to point speed trap controlled area and compares this average speed with the threshold speed value associated with the road segment and stored in the memory unit 12-15.

So, after entering the point to point speed trap controlled area the navigation device 10 may be arranged to start calculating the average speed of the navigation device 10 in between the first detection point and the current position. The navigation device 10 may periodically provide speeding warnings if the average speed exceeds the threshold speed value.

It will be understood that also a combination of the two examples given above may be employed, i.e. the navigation device 10 may be arranged to determine both the current speed as the average speed of the navigation device 10 and compare these with a threshold speed value. If one of the current/average speed is higher than the threshold speed value, the navigation device 10 may periodically give a speeding warning. Such a speeding warning may be a distinct sound or spoken message played over speaker 29, and/or a visual warning, such as an icon displayed at display 18. In case the speeding warning is a spoken speeding warning, the spoken warning may for instance be: 'You are still in point to point controlled area and you are driving too fast' or 'You are still in point to point controlled area and you are driving too fast. The speed limit in this area is 100 km/h.'

Average Speed Indication

The speeding warnings may be a current speed indication or an average speed indication and may be given periodically during the whole point to point controlled area. The period of the speeding warnings may be 5 to 20 seconds depending on how much the speed limit is exceeded, using a so called adaptive scheme. The average speed indication may also be given constantly, i.e. may be updated for each new position received from the positioning device 23.

For example, if the driver drives much too fast then the warnings may be provided early within the point to point controlled area, to give the driver time to correct the total average speed. If on the other hand the driver is speeding a little, then there is no need to annoy with the warnings too frequently or to early within the point to point controlled area.

The navigation device 10 may be arranged to display an average speed indication, informing the user of the average speed from the first detection point P1 to the current position in between the first detection point P1 and the second detection point P2. Such an average speed indication may be computed by continuously computing the average speed so far, using the time at which the first detection point has been passed, the location of the first detection point P1, the current time and the current position as input. The average speed indication may be updated every second or so.

In combination with the average speed indication a target average speed may be displayed, for instance being the speed limit for the point to point controlled area or the threshold speed value associated with the point to point controlled area.

Also, in combination with the average speed indication, an advisory speed $v_{adv}$ may be displayed, informing the driver of an advised speed. When the point to point is entered, this advisory speed $v_{adv}$ may be the speed limit for the point to point controlled area or the threshold speed value $v_{threshold}$ associated with the point to point controlled area. However, during the travel from the first detection point P1 and the second point P2, the advisory speed $v_{adv}$ may change, as a result of the driving behavior so far.

For instance, in case the navigation device 10 detects that it is half way the point to point controlled area, and the average speed so far exceeds the threshold speed value $v_{threshold}$, the advisory speed $v_{adv}$ is chosen such, that in case the user follows the advisory speed $v_{adv}$, the average speed $v_{average}$ at the end of the point to point controlled area does not exceed the threshold speed value $v_{threshold}$.

The advisory speed $v_{adv}$ may be computed by first computing an advisory time $t_{adv}$ at which the navigation device 10 is to pass the second detection point P2 may be computed:

$$t_{adv} = t_1 + \frac{X}{v_{threshold}},$$

where t1 is the time of passing the first detection point P1, X is the distance between the first and second detection point P1, P2 and $v_{threshold}$ is the threshold speed value associated with the particular point to point speed trap.

The advisory speed $v_{adv}$ may be computed:

$$v_{adv} = \frac{L_2 - L_{current}}{t_{adv} - t_{current}},$$

where $t_{adv} > t_{current}$ and where $L_{current}$ is the current location of the navigation device as for instance measured by the positioning device 23, $L_2$ the location of the second detection point P2, $t_{current}$ the current time. In case $t_{adv} < t_{current}$, the speed of the navigation device 10 is relatively slow. In order to prevent a negative advisory speed $v_{adv}$, no further warnings are needed if $t_{adv} < t_{current}$.

Of course, all warnings and indications may also be provided as an audible message via speaker 29.

In case the user is driving extremely slow or fast compared to the threshold speed $v_{threshold}$, the advisory speed $v_{adv}$ may be very high or very low respectively. In order to prevent an advisory speed to be provided that is in conflict with the law, the $V_{advisory}$ may be compared with an upper and/or lower speed limit for the advisory speed. The upper speed limit may be the same as the speed limit or threshold speed and the lower speed limit may correspond to the minimum allowable speed according to the law. This check may be part of action 107.

The advisory speed may be provided to the user by an advisory speed indication, that may be passive or silent, for instance an icon in the corner of the display 18.

Flow Diagram Embodiment 2

FIG. 5 schematically depicts a flow diagram according to the second embodiment. FIG. 5 is similar to FIG. 4, except for the fact that in between action 104 and 105 an extra action 107 is provided.

Once action 104 is completed, the navigation device 10 may start a speeding warning procedure. As explained above, this speeding warning procedure may comprise comparing the current speed to a threshold speed value and/or comparing the average speed to a threshold speed value.

Further Embodiments

According to a further embodiment, a navigation device 10 is provided for providing warnings when a detection point of a speed trap is approached, the navigation device 10 comprising a processor unit 11 and a memory unit 12-15, the processor unit 11 being arranged to communicate with the memory units 12-15 and to receive positional information from a positioning device 23, the memory unit 12-15 being arranged to comprise a speed trap database, comprising at least one detection point P1 of a location of a speed trap, where the navigation device 10 is further arranged to provide a warning when one of the at least one detection point P1 is approached, wherein navigation device 10 is arranged to provide speeding warnings from the detection point P1, if the navigation device 10 detects that a speed of the navigation device 10 exceeds a threshold speed value, the threshold speed value being stored in the memory unit 12-15.

Such a navigation device 10 provides speeding warnings when in a controlled area. Also, the navigation device 10 may be arranged to first check if the speed trap is a point to point speed trap.

According to a variant, the speed is determined based on received positional information from the positioning device 23.

According to a variant, the navigation device is arranged to provide a speeding warning if a current speed of the navigation device 10 exceeds the threshold speed value.

According to a variant, the navigation device 10 is arranged to provide a speeding warning if an average speed of the navigation device 10 exceeds the threshold speed value. The average speed may be computed from the first detection point to the current position.

According to a variant, the navigation device 10 is arranged to compute an advisory speed $v_{adv}$. This advisory speed may advise the user what speed to obey in order to prevent leaving the point to point speed trap controlled area to soon.

According to a variant, the memory unit 12-15 is further arranged to comprise at least a further detection point P2 associated with at least one of the stored detection points P1, the detection point P1 and the further detection point P2 both relate to a same point to point speed trap, where the navigation device 10 is further arranged to stop providing speeding warnings when the further detection point P2 is approached or has been passed. The navigation device may further be arranged to provide a warning when the further detection point P2 is approached or has been passed.

The embodiments described above may be used in all kinds of navigation device 10, such as portable, hand-held, built-in navigation device 10. Of course, the embodiments may also be used in a built-in board computer of a vehicle, or as part of a car radio system.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein. It will be understood by a skilled person that all software components may also be formed as hardware components.

The descriptions above are intended to be illustrative, not limiting. Thus, it will be apparent to one skilled in the art that modifications may be made to the invention as described without departing from the scope of the claims set out below.

The invention claimed is:

1. Navigation device for providing warnings when moving, the navigation device comprising:
   a processor unit; and
   a memory unit that stores a database comprising:
      one or more point to point speed trap locations, wherein each point to point speed trap comprises two detection point locations forming a start point and an end point of the point to point speed trap,
   the processor unit is arranged to communicate with the memory unit and to receive positional information from a positioning device,
   wherein the processor unit is arranged to use the received positional information to determine whether a point to point speed trap exists at a location associated with the received positional information;
   wherein, when a point to point speed trap exists at a location, the navigation device is arranged to detect a speed between the two detection point locations and to provide a point to point speed warning, the point to point speed warning comprising a first warning between the two detection point locations when a threshold speed or speed limit associated with the point to point speed trap is exceeded and providing a second warning indicating an end point in the point to point speed trap after passing the end point of the point to point speed trap; and
   wherein the processor unit is further arranged to compute an average speed within the point to point speed trap and compute an adjustable advisory speed for travel within the point to point speed trap based on the average speed, a driving behavior within the point to point speed trap and the threshold speed or the speed limit for the road segment associated with the point to point speed trap and display the advisory speed on the navigation device.

2. Navigation device according to claim 1, further comprising a display to provide the warning as a visual warning.

3. Navigation device according to claim 1, further comprising a speaker to provide the warning as an audible warning.

4. Navigation device according to claim 2, further comprising a speaker to provide the warning as an audible warning, wherein the warning is a combination of a visual and an audible warning.

5. Navigation device according claim 1, wherein the detected speed is determined based on received positional information from the positioning device.

6. Navigation device according to claim 1, wherein the navigation device is arranged to provide a speeding warning if a current speed of the navigation device exceeds the threshold speed value.

7. Vehicle, comprising a navigation device according to claim 1.

8. The navigation device of claim 1, wherein the average speed is calculated using positional information from the navigation device received between the two detection point locations.

9. The navigation device of claim 1, wherein the advisory speed is an advised speed determined to maintain an average speed below the threshold value or speed limit when within the point to point speed trap.

10. The navigation device of claim 1, wherein the processor unit is arranged to determine a speed trap type when a speed trap exists at the location associated with the received positional information.

11. The navigation device of claim 1, wherein the database further comprises one or more non-point to point speed trap locations.

12. The navigation device of claim 1, wherein a timing for providing the first warning is adjusted based on how much the threshold speed or speed limit has been exceeded.

13. The navigation device of claim 1, wherein the processing unit further computes an advisory time based a current location of the navigation device and an end point of the point to point speed trap.

14. The navigation device of claim 1, wherein the computation of the average speed occurs continuously within the point to point speed trap.

15. The navigation device of claim 11, wherein, the navigation device is arranged to provide a general warning when a threshold speed associated with a speed trap is exceeded when the processing unit determines that the speed trap location is a non-point to point speed trap location.

16. Method performed on a navigation device for providing warnings when moving, the method comprising:
   receiving positional information from the navigation device to determine whether a speed trap exist at a location associated with the received positional information;
   providing a database stored in the memory of the navigation device comprising one or more point to point speed trap locations, wherein each point to point speed trap comprises two detection point locations forming a start point and an end point of the point to point speed trap;
   providing a point to point speed warning, when point to point speed trap exists at the location, the point to point speed warning comprising a first warning when the threshold speed or speed limit is exceeded by a speed as determined by the navigation device, between the two detection point locations and providing a second warning indicating an end point in the point to point speed trap after passing the end point of the point to point speed trap;
   computing the an average speed within the point to point speed trap;
   computing an adjustable advisory speed for travel within the point to point speed trap based on the average speed, a driving behavior within the point to point speed trap and the threshold speed or the speed limit for the road segment associated with the point to point speed trap; and
   displaying the advisory speed on the navigation device.

17. Method according to claim 16, wherein the speed of the navigation device is determined based on received positional information from a positioning device.

18. Method according to claim 16, wherein a speeding warning is provided if a current speed exceeds the threshold speed value.

19. Non-transitory computer media containing a computer program that, when loaded on a computer arrangement, is arranged to perform the method of claim 16.

20. A navigation device for providing warnings when moving, the navigation device comprising:
   a processor unit; and
   a memory unit that stores a database comprising:
   one or more point to point speed trap locations, wherein each point to point speed trap comprises two detection point locations forming a start point and an end point of the point to point speed trap,
   the processor unit is arranged to communicate with the memory unit and to receive positional information from a positioning device,
   wherein the processor unit is arranged to use the received positional information to determine whether a point to point speed trap exists at a location associated with the received positional information; and
   wherein, when a point to point speed trap exists at a location, the navigation device is arranged to:
   provide a first warning indicating entry into the point to point speed trap after passing the start point of the point to point speed trap;
   provide a second warning indicating exit from the point to point speed trap after passing the end point of the point to point speed trap; and
   continuously compute an average speed during travel within the point to point speed trap and provide a speeding warning in between the start point and end point of the point to point speed trap if the computed average speed exceeds a threshold speed or speed limit associated with the point to point speed trap.

21. The navigation device of claim 20, wherein the average speed is computed based on a time at which the start point was passed, the location of the start point, the current time and the current position of the device.

22. A method performed on a navigation device for providing warnings when moving, the method comprising:
   receiving positional information from the navigation device to determine whether a speed trap exist at a location associated with the received positional information;
   providing a database stored in the memory of the navigation device comprising one or more point to point speed trap locations, wherein each point to point speed trap comprises two detection point locations forming a start point and an end point of the point to point speed trap;
   providing a point to point speed warning, when point to point speed trap exists at the location, the point to point speed warning comprising a first warning when the threshold speed or speed limit is exceeded by a speed as determined by the navigation device, between the two detection point locations and providing a second warning indicating an end point in the point to point speed trap after passing the end point of the point to point speed trap; and
   continuously computing an average speed during travel within the point to point speed trap and provide a speeding warning in between the start point and end point of the point to point speed trap if the computed average speed exceeds a threshold speed or speed limit associated with the point to point speed trap.

23. Non-transitory computer media containing a computer program that, when loaded on a computer arrangement, is arranged to perform the method of claim 22.

* * * * *